(12) United States Patent
Zhu et al.

(10) Patent No.: US 10,718,648 B2
(45) Date of Patent: Jul. 21, 2020

(54) METHOD FOR DETERMINING A PHYSICAL PARAMETER OF A COMPRESSIBLE MEDIUM WITH A MEASURING TRANSDUCER OF VIBRATION-TYPE AND MEASURING TRANSDUCER FOR PERFORMING SUCH A METHOD

(71) Applicant: Endress+Hauser Flowtec AG, Reinach (CH)

(72) Inventors: Hao Zhu, Fresing (DE); Alfred Rieder, Landshut (DE)

(73) Assignee: Endress+Hauser Flowtec AG, Reinach (CH)

( * ) Notice: Subject to any disclaimer, the term of this patent is extended or adjusted under 35 U.S.C. 154(b) by 36 days.

(21) Appl. No.: 16/311,953

(22) PCT Filed: May 18, 2017

(86) PCT No.: PCT/EP2017/061916
§ 371 (c)(1),
(2) Date: Dec. 20, 2018

(87) PCT Pub. No.: WO2018/001634
PCT Pub. Date: Jan. 4, 2018

(65) Prior Publication Data
US 2019/0154485 A1 May 23, 2019

(30) Foreign Application Priority Data
Jun. 30, 2016 (DE) .................. 10 2016 112 002

(51) Int. Cl.
*G01F 1/74* (2006.01)
*G01F 1/84* (2006.01)
(Continued)

(52) U.S. Cl.
CPC .............. *G01F 1/8436* (2013.01); *G01F 1/74* (2013.01); *G01F 15/02* (2013.01);
(Continued)

(58) Field of Classification Search
CPC ............... G01F 1/84; G01F 1/74; G01F 15/02
See application file for complete search history.

(56) References Cited

U.S. PATENT DOCUMENTS

| 6,502,466 | B1 | 1/2003 | Cage et al. |
| 7,350,421 | B2 * | 4/2008 | Anklin-Imhof ....... G01F 1/8409 73/861.355 |

(Continued)

FOREIGN PATENT DOCUMENTS

| DE | 10237209 A1 | 3/2004 |
| DE | 102004007889 A1 | 9/2005 |

(Continued)

OTHER PUBLICATIONS

Search Report for German Patent Application No. 10 2016 112 002.2, German Patent Office, dated Feb. 16, 2017, 7 pp.
(Continued)

*Primary Examiner* — Jewel V Dowtin
(74) *Attorney, Agent, or Firm* — Christopher R. Powers; Endress+Hauser (USA) Holding Inc.

(57) ABSTRACT

A method for determining density and/or mass flow of a compressible medium with a measuring transducer of vibration-type having at least two oscillators, each including a pair of measuring tubes, wherein the pairs of measuring tubes are arranged for parallel flow, wherein the two oscillators have mutually independent oscillator oscillations with mutually differing eigenfrequencies for corresponding oscillation modes. The method includes steps of determining the values of the eigenfrequencies of at least two different oscillator oscillations, determining at least two preliminary
(Continued)

density measured values based on the values of the eigenfrequencies, and determining a correction term for one of the preliminary density measured values and/or for a preliminary measured value of flow based on the preliminary density measured values and the values of the eigenfrequencies.

19 Claims, 6 Drawing Sheets

(51) Int. Cl.
    *G01F 15/02*     (2006.01)
    *G01F 25/00*     (2006.01)
    *G01N 9/00*     (2006.01)
    *G01N 11/16*     (2006.01)

(52) U.S. Cl.
    CPC ......... *G01F 25/0007* (2013.01); *G01N 9/002* (2013.01); *G01N 11/16* (2013.01); *G01F 1/8477* (2013.01); *G01N 2009/004* (2013.01)

(56) References Cited

U.S. PATENT DOCUMENTS

| | | | | |
|---|---|---|---|---|
| 7,555,962 | B2 * | 7/2009 | Bitto | G01F 1/8409 |
| | | | | 73/861.355 |
| 7,658,115 | B2 * | 2/2010 | Rieder | G01F 1/8409 |
| | | | | 73/861.355 |
| 8,113,064 | B2 * | 2/2012 | Huber | G01F 1/8409 |
| | | | | 73/861.357 |
| 8,596,144 | B2 * | 12/2013 | Rieder | G01F 1/8495 |
| | | | | 73/861.55 |
| 2006/0169058 | A1 | 8/2006 | Gysling | |
| 2009/0013799 | A1 | 1/2009 | Gysling | |
| 2010/0198531 | A1 | 8/2010 | Bell et al. | |
| 2011/0023626 | A1 | 2/2011 | Weinstein | |
| 2015/0160056 | A1 | 6/2015 | Schollenberger et al. | |
| 2019/0154486 | A1 * | 5/2019 | Zhu | G01F 25/0007 |

FOREIGN PATENT DOCUMENTS

| | | |
|---|---|---|
| DE | 102009027580 A1 | 1/2011 |
| DE | 102009055069 A1 | 6/2011 |
| DE | 102011010178 A1 | 8/2012 |
| DE | 102012109729 A1 | 5/2014 |
| DE | 102015104931 A1 | 6/2016 |
| DE | 102015112737 A1 | 2/2017 |
| DE | 102015122661 A1 | 6/2017 |
| EP | 2026042 A1 | 2/2009 |

OTHER PUBLICATIONS

Search Report for International Patent Application No. PCT/EP2017/061916, WIPO, dated Jul. 27, 2017, 14 pp.

\* cited by examiner

METHOD FOR DETERMINING A PHYSICAL PARAMETER OF A COMPRESSIBLE MEDIUM WITH A MEASURING TRANSDUCER OF VIBRATION-TYPE AND MEASURING TRANSDUCER FOR PERFORMING SUCH A METHOD

CROSS-REFERENCE TO RELATED APPLICATIONS

The present application is related to and claims the priority benefit of German Patent Application No. 10 2016 112 002.2, filed on Jun. 30, 2016 and International Patent Application No. PCT/EP2017/061916 filed on May 18, 2017, the entire contents of which are incorporated herein by reference.

TECHNICAL FIELD

The present invention relates to a method for determining a physical parameter, especially the density and/or the mass flow, of a compressible medium with a measuring transducer of vibration-type as well as to a measuring transducer for performing such a method.

BACKGROUND

Measuring transducers of vibration-type comprise, usually, at least one oscillatable measuring tube for guiding the medium, wherein the measuring tube has bending oscillation modes, whose eigenfrequencies depend on the density of the medium. Based on a measured eigenfrequency, the density can then be determined. Compressible media oscillate relative to an oscillating measuring tube, which leads to a change of the eigenfrequency of the measuring tube compared with the eigenfrequency of a measuring tube that is filled with an incompressible medium of equal density. The closer the resonance frequency of the medium approximates the eigenfrequency of the considered bending oscillation mode, the greater is the change of the eigenfrequency. The consideration of the ratio of two eigenfrequencies offers, consequently, an approach for ascertaining the described influence of the compressibility of the medium and for correcting a density or flow measurement correspondingly.

The as-yet unpublished patent applications DE 10 2015 122 661.8 and DE 10 2015 112 737.7 disclose corresponding methods for ascertaining a physical parameter of a medium containing gas, or a medium which is a gas. In both methods, the eigenfrequencies of the f1 mode and the f3 mode are evaluated, to ascertain the velocity of sound in the medium, or the thereto proportional resonance frequency of its oscillations relative to the measuring tube of a measuring transducer, in order on this basis to be able to ascertain and correct the influence on the eigenfrequencies of the two modes. The described methods are applied especially in the case of measuring transducers with two parallelly extending measuring tubes, which oscillate oppositely to one another.

Known, for example, from DE 10 2011 010 178 A1 as measuring transducers for greater flow rates are measuring transducers having two curved measuring tube pairs. In the case of these measuring transducers, the measuring tubes are mechanically coupled, so that the two measuring tube pairs oscillate with essentially the same frequency. Thus, these measuring transducers behave like measuring transducers with only one measuring tube pair. The measuring transducer according to DE 10 2011 010 178 A1 has a compact design, wherein the two curved measuring tube pairs have equally sensed courses. The two measuring tube pairs have because of different mass distributions per se significantly differing eigenfrequencies. Nevertheless, to get to a shared eigenfrequency, substantial couplers are provided between each two tubes. This interferes with excitation of a stable f3 mode.

SUMMARY

It is an object of the present invention to make the principle underpinning the above described method also available for flow meters with more than one measuring tube pair.

The object of the invention is achieved by the method as defined in independent claim 1.

The inventors of the present invention build on their development of a measuring transducer with two measuring tube pairs oscillating independently of one another, as such is described in the as-yet unpublished patent application DE 10 2015 104 931.7. The two measuring tube pairs, which oscillate essentially independently of one another and which have for corresponding modes different eigenfrequencies, offer expanded opportunities for ascertaining the effect of compressibility and for preventing measurement errors caused thereby.

The method of the invention for determining a physical parameter of a compressible medium by means of a measuring transducer of vibration-type, which has at least two oscillators, which are formed, in each case, by a pair of measuring tubes, wherein the pairs of measuring tubes are arranged for parallel flow, wherein the two oscillators have mutually independent oscillator oscillations with mutually differing eigenfrequencies $f_{i,j}$ for corresponding oscillation modes, wherein the index i refers to the oscillatory mode and the index j refers to the oscillator, thus $f_{i,1} \neq f_{i,2}$, comprises steps as follows:

determining the values of the eigenfrequencies $f_{i,j}$ of at least two different oscillator oscillations;

determining at least two preliminary density measured values based on the values of the eigenfrequencies $f_{i,j}$;

determining a correction term for one of the preliminary density measured values and/or for a preliminary measured value of flow based on the preliminary density measured values and the values of the eigenfrequencies $f_{i,j}$.

A compressible medium of the invention can especially comprise a gas, or a gas-containing medium. Both the gas as well as also the medium can, in each case, be a pure substance or a mixture.

To the extent that the compressible medium comprises a gas-containing medium, the method of the invention can be especially advantageously used when the gas is present in the form of suspended bubbles.

Suspended bubbles are especially bubbles whose radius is no more than five times, especially no more than three times, a penetration depth δ, wherein $$\delta = (\nu/(\pi^* f_{low}))^{1/2},$$

wherein ν is the kinematic viscosity of the medium and $f_{low}$ the lowest of the eigenfrequencies referenced for evaluation.

The penetration depth δ describes the reach of a flow field because of relative movements of a suspended bubble relative to the medium surrounding it. In the case of small radii, suspended bubbles essentially affect the compressibility, while in the case of radii, which significantly exceed the penetration depth, additional effects occur, which degrade the accuracy of the corrections of the invention.

To a first approximation, a preliminary density value $\rho_{i,j}$ of a compressible medium is related to the eigenfrequency $f_{i,j}$ of an $f_{i,j}$ mode as follows:

$$\rho_{i,j} = c_{0,i,j} + c_{1,i,j}\frac{1}{f_{i,j}^2} + c_{2,i,j}\frac{1}{f_{i,j}^4},$$

wherein $c_{0,i}$, $c_{1,i}$, and $c_{2,i}$, are mode dependent coefficients.

The above approximation does not, however, take into consideration the influences of the oscillating, compressible medium relative to the measuring tube. The closer the resonance frequency of the oscillating, compressible medium lies to the eigenfrequency of a bending oscillation mode, the more strongly the eigenfrequency is influenced. Since the resonance frequency of the compressible medium lies, usually, above the eigenfrequency of the bending oscillation modes, the influence on the bending oscillation modes is greater with higher eigenfrequencies. This leads to different preliminary mode specific density values, wherein the ratio between the preliminary density values provides an opportunity for ascertaining and correcting the influence of the oscillating, gas-containing medium.

In a further development of the invention, the correction term for the preliminary density measured value of an oscillator depends on a quotient between the velocity of sound in the compressible medium, or a resonance frequency of oscillations of the compressible medium relative to a measuring tube of the oscillator, on the one hand, and the value of the eigenfrequency of the oscillator, on the other hand.

For this, in an embodiment of the invention, firstly, the velocity of sound, or the resonance frequency, is ascertained, for which the observed ratio of the preliminary density measured values is to be expected. Which mathematical procedure is used in such case is of lesser importance.

For example, the velocity of sound c can be determined, wherein the quotient of a first correction term for a first preliminary density value divided by a second correction term for a second preliminary density value corresponds to the quotient of the first preliminary density value divided by the second preliminary density value.

In a further development of the invention, the correction term $K_{i,j}$ for the preliminary density values $\rho_{i,j}$ based on the eigenfrequency of the $f_{i,j}$-mode has the following form:

$$K_{i,j} := \left(1 + \frac{r}{\left(\frac{g \cdot c}{f_{i,j}}\right)^2 - b}\right)$$

wherein $$\rho_{corr} := \frac{\rho_{i,j}}{K_{i,j}},$$

wherein r and g are media independent constants, c is the velocity of sound in the compressible medium, $f_{i,j}$ is the eigenfrequency of the $f_{i,j}$ mode, $\rho_{corr}$ is the corrected density, and b is a scaling constant, wherein especially: r/b<1, especially r/b<0.9, and/or b=1.

In a further development of the invention, in the above equation, g is a proportionality factor between a resonance frequency $f_{res}$ of the gas-containing medium and the velocity of sound in the gas-containing medium dependent on the diameter of the measuring tube, thus:

$$f_{res} = g \cdot c.$$

In a further development of the invention, a density error $E_{\rho i,j}$ of a preliminary density value based on the eigenfrequency of the $f_{i,j}$-mode is:

$$E_{\rho i,j} := K_{i,j} - 1,$$

wherein a mass flow error $E_{m,j}$ of a preliminary mass flow value through the measuring tube pair of the oscillator with the index j is ascertained proportionally to the density error $E_{\rho 1,j}$ of the first preliminary density value based on the eigenoscillation of this oscillator in the f1 mode, thus:

$$E_{m,j} := k \cdot E_{\rho 1,j},$$

wherein the proportionality factor k is not less than 1.5, for example, not less than 1.8 and especially not less than 1.9, wherein the proportionality factor k is not more than 3, for example, not more than 2.25 and especially not more than 2.1. In a currently preferred embodiment of the invention, the proportionality factor k=2.

For a correction term $K_{m,j}$ for the mass flow, the following holds:

$$K_{m,j} := 1 + E_{m,j},$$

wherein the corrected mass flow $\dot{m}_{corr,j}$ through the measuring tube pair of the oscillator with the index j is ascertained as $$\dot{m}_{corr,j} \cdot = \frac{\dot{m}_{p,j}}{K_{m,j}},$$

and wherein $\dot{m}_{p,j}$ is the preliminary mass flow value through the measuring tube pair of the oscillator with the index j. The total corrected mass flow $\dot{m}_{corr,total}$ through the measuring transducer is ascertained by summing the contributions of the individual oscillators, thus: $\dot{m}_{corr,total} = \dot{m}_{corr,1} + \dot{m}_{corr,2}$.

To the extent that the measuring tube pairs of the two oscillators have different flow resistances and different eigenfrequencies, a separate preliminary mass flow value $\dot{m}_{p,j}$ and a separate correction factor $K_{m,j}$ are ascertained for each of these oscillators. The determining of the velocity of sound underpinning the ascertaining of the correction factors does not, of course, need to occur separately for each oscillator. For this, according to the invention, any two oscillation modes having different eigenfrequencies and associated preliminary density values can be taken into consideration.

In a further development of the invention, the eigenfrequencies $f_{i,1}$ and $f_{i,2}$ of the corresponding bending oscillation modes, especially the eigenfrequencies $f_{i,1}$ and $f_{i,2}$ of the bending oscillation, wanted modes (in the following, called the wanted modes for short), of the two oscillators are ascertained and taken into consideration for determining the correction term. This further development of the invention, is especially advantageous, since here the required information can be won without additional effort, since the wanted modes of the two oscillators are excited in any event, to be able to operate the flow meter. In this case, the two wanted modes must have different eigenfrequencies and be influenced differently by the oscillations of the medium relative to the measuring tube.

In a further development of the invention, the eigenfrequency $f_{1,j}$ of a wanted mode and the eigenfrequency of an $f_{3,j}$ mode are ascertained and taken into consideration for determining the correction term.

In a further development of the invention, the lowest available eigenfrequency of a wanted mode is taken into consideration for determining the correction term.

In a further development of the invention, the highest available eigenfrequency of an f3 mode is taken into consideration for determining the correction term.

In a further development of the invention, the method additionally includes steps as follows:

determining a difference between a first preliminary density value and a second preliminary density value; checking whether the difference is greater than a reference value; and, when this is the case, ascertaining and, in given cases, outputting a value for the velocity of sound.

In a further development of the invention, the reference value for the difference of the density values is selected such that the velocity of sound can be determined with a statistical error of no more than 10%, especially no more than 5% and preferably no more than 2%.

In a further development of the invention, the reference value is not less than 0.2 kg/m$^3$ especially not less than 0.4 kg/m$^3$, wherein the reference value is further no more than 2 kg/m$^3$, for example, no more than 1 kg/m$^3$, and especially no more than 0.6 kg/m$^3$.

In a further development of the invention, the method is especially applied when the medium oscillating in the measuring tube has a resonance frequency, which is no more than 20 times the lower evaluated eigenfrequencies.

A measuring transducer of the invention, especially for performing the method of the invention, comprises:

four measuring tubes; at least a first actuator arrangement and a second actuator arrangement; at least a first sensor arrangement and a second sensor arrangement, wherein all four measuring tubes are combined inlet end and outlet end with collectors for parallel flow, wherein the first measuring tube and the second measuring tube are connected together inlet end and outlet end with, in each case, at least one rigid node plate, which is arranged spaced from the collector at its end to form a first oscillator, wherein the first actuator arrangement is adapted to excite a wanted mode between the two measuring tubes of the first oscillator, wherein the third measuring tube and the fourth measuring tube are connected together inlet end and outlet end with, in each case, at least one rigid node plate, which is arranged spaced from the collector at its end to form a second oscillator, wherein the second actuator arrangement is adapted to excite a wanted mode between the two measuring tubes of the second oscillator, wherein the first oscillator and the second oscillator have their own wanted modes with first and second wanted mode eigenfrequencies ($f_{11}$, $f_{12}$), respectively, wherein the magnitude of the difference between the wanted mode eigenfrequencies of the two oscillators ($|f_{11}-f_{12}|$) is at least 0.1 times, for example, at least 0.2 times and especially at least 0.4 times the lesser of the two wanted mode eigenfrequencies, wherein the first sensor arrangement is adapted to register oscillations of the first oscillator, and wherein the second sensor arrangement is adapted to register oscillations of the second oscillator, wherein the measuring transducer further includes an operating- and processing circuit for driving the actuator arrangements and for registering the signals of the sensor arrangements, wherein the operating circuit- and evaluating circuit is adapted to drive the actuator arrangements such that the bending oscillation modes of the first and second oscillators are excited at their own eigenfrequencies independently of one another, wherein the operating- and evaluating circuit is adapted further to perform the method of the invention.

In a further development of the invention, the measuring tubes of the first oscillator extend symmetrically to a first mirror plane, wherein the measuring tubes of the second oscillator likewise extend symmetrically to the first mirror plane, and the first mirror plane extends between the measuring tubes of the first oscillator and between the measuring tubes of the second oscillator.

In a further development of the invention, the measuring tubes of the first oscillator extend symmetrically to a second mirror plane, which extends perpendicularly to the first mirror plane and cuts the measuring tubes of the first oscillator, wherein the measuring tubes of the second oscillator likewise extend symmetrically to the second mirror plane and are cut by the second mirror plane.

The measuring tubes oscillate in the wanted mode especially perpendicularly to the first mirror plane and symmetrically to the second mirror plane.

In a further development of the invention, the operating circuit is adapted so to drive the actuator arrangements that the wanted modes of the first and second oscillators are excited simultaneously.

In a further development of the invention, the measuring tubes at least of one oscillator, preferably both oscillators, are excited, in each case, in a second oscillatory mode symmetric to the second mirror plane and having a higher eigenfrequency than the particular wanted mode of the oscillator. These oscillation modes are, usually, referred to as the $f_3$-modes in connection with the present invention, also as $f_{3,j}$-modes when it is desired to distinguish between the $f_3$-modes of the two oscillators.

In a further development of the invention, the operating circuit is adapted so to drive the actuator arrangements that at least one of the $f_{3,j}$-modes is excited, especially the wanted modes of both oscillators, especially simultaneously with the wanted mode of a particular oscillator.

In a further development of the invention, the first and the second oscillators are adapted, when the measuring tubes are passed through by a mass flow, to have flow dependent deflections (in the following "Coriolis deflections"), in each case, superimposed on the wanted modes and caused by Coriolis forces, wherein the first sensor arrangement and the second sensor arrangement, in each case, have at least two sensor elements, to register a phase shift between a particular Coriolis deflection and the associated wanted mode, wherein the operating circuit is adapted as a function of the phase shift of a particular Coriolis deflection to ascertain a first preliminary mass flow value through the measuring tubes of the first oscillator and a second preliminary mass flow through the measuring tubes of the second oscillator, in given cases, to perform corrections of the invention, and to output a corrected total flow measured value.

In a further development of the invention, the Coriolis mass flow measuring device (CMD) has curved measuring tubes, wherein the measuring tubes, in each case, have a tube central axis, wherein inlet end and outlet end intersections of the tube central axes of the measuring tubes of an oscillator with the end faces of the measuring tubes, in each case, define a base plane of the oscillator, wherein the measuring tubes of an oscillator have a length (l), wherein the tube central axes of the measuring tubes of the first oscillator—with reference to the base plane of the first oscillator—at half tube length (l/2) are turned away from the base plane of the second oscillator, and wherein the tube central axes of the measuring tubes of the second oscillator—with reference to the base plane of the second oscillator—at half tube length (I/2) are turned toward the measuring tubes of the first oscillator.

DETAILED DESCRIPTION

In a further development of the invention, the collectors provided inlet end and outlet end are embodied stably in such a manner that they fulfill the functionality of node plates.

In a further development, the measuring transducer includes a support tube, which connects the inlet end collector and the outlet end collector rigidly together.

In a further development of the invention, the first measuring tube and the third measuring tube lie in a shared first plane, and the second measuring tube and the fourth measuring tube lie in a shared second plane, wherein the first plane and the second plane extend in parallel with one another.

The shared first and second planes are especially the planes in which the measuring tube axes of the measuring tubes extend.

The shared first and second shared planes extend especially in parallel with the first mirror plane defined above.

For achieving the different wanted mode eigenfrequencies, according to a further development of the invention, the oscillators differ in at least one of the following properties:
  wall thickness of the measuring tubes
  oscillatable length of the measuring tubes
  inner diameter of the measuring tubes
  outer diameter of the measuring tubes
  tube material
  shape of the node plates
  position of the node plates
  supplemental masses on the measuring tubes,
wherein, currently, the oscillatable length and/or the position of the node plates and/or the shape of the node plates are preferable as differing properties.

BRIEF DESCRIPTION OF THE DRAWING

The invention will now be explained in greater detail based on the example of an embodiment described in the drawing, the figures of which show as follows.

Figure 1:
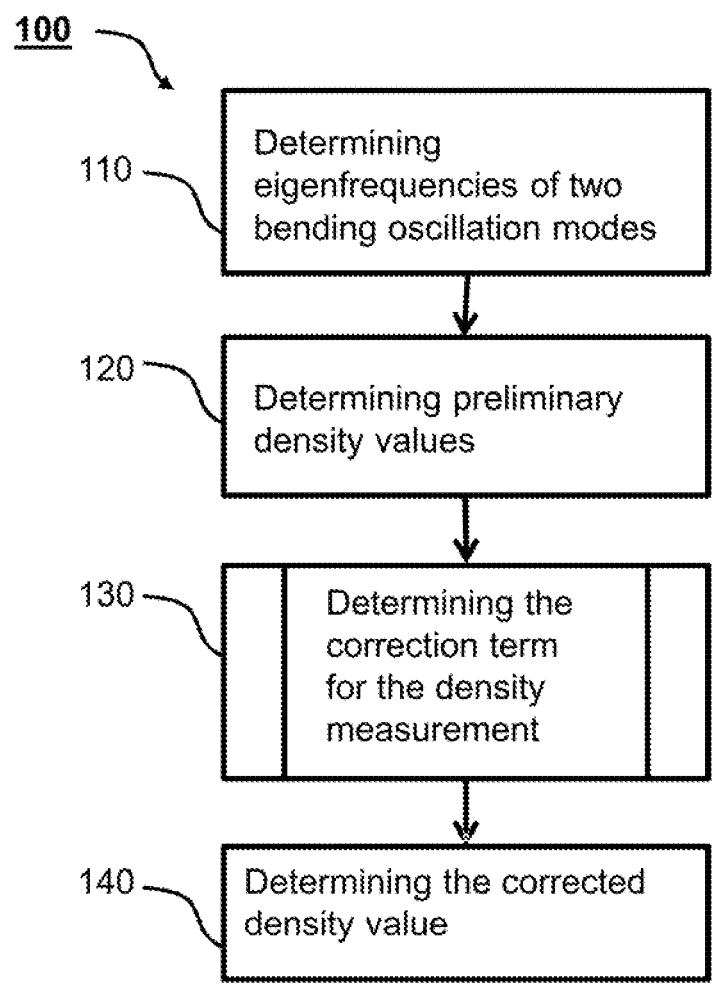
FIG. 1 shows a flow diagram for a first example of an embodiment of a method of the invention.

The example of an embodiment of a method 100 of the invention shown in FIG. 1 for determining density value begins in a step 110 of determining the eigenfrequencies of the two bending oscillation modes of different eigenfrequency, for example, the $f_{1,j}$ wanted modes of the two oscillators. The sought eigenfrequencies can be ascertained by maximizing ratio of oscillation amplitude to mode specific excitation power by varying excitation frequency.

Using the ascertained eigenfrequencies fi, in a step 120, preliminary density values $\rho_{1,1}$ and $\rho_{1,2}$ are determined according to the formula:

$$\rho_{1,j} = c_{0,i,j} + c_{1,1,j}\frac{1}{f_{i,j}^2} + c_{2i}\frac{1}{f_{1,j}^4},$$

wherein $c_{0,1,j}$, $c_{1,1,j}$ and $c_{2,1,j}$, with j=1, 2 are the mode dependent coefficients for the wanted modes of the two oscillators.

In a step 130, which is explained below in greater detail based on FIGS. 2 to 4, the determining of a correction term for density measurement occurs.

Finally, in a step 140, a corrected density value is determined using the correction term.

Figure 2:
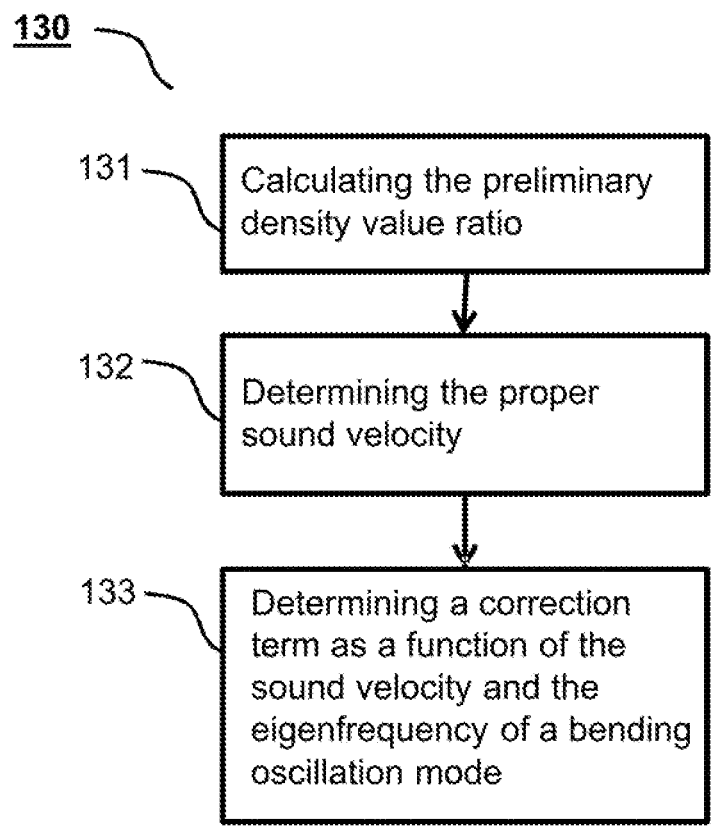
FIG. 2 shows a flow diagram for a detail of the first example of an embodiment of the method of the invention.

As shown in FIG. 2, the step 130 includes for determining the correction term, firstly, in a step 131, the calculating of the ratio V of the preliminary density values, thus, for example, the division of the preliminary density values $\rho_{1,1}$ and $\rho_{1,2}$ to form $V:=\rho_{1,1}/\rho_{1,2}$.

Then, in a step 132, the velocity of sound c is determined, which with the measured eigenfrequencies of the bending oscillation modes leads to the calculated ratio V of the preliminary density values:

$$\frac{\left(1 + \dfrac{r}{\left(\dfrac{g_1 \cdot c}{f_{1,1}}\right)^2 - b}\right)}{\left(1 + \dfrac{r}{\left(\dfrac{g_2 \cdot c}{f_{1,2}}\right)^2 - b}\right)} = V$$

wherein r is, for instance, 0.84, b=1 and $g_j$ with j=1,2 being measuring tube dependent, proportionality factors between velocity of sound and resonance frequency. When the measuring tubes of both oscillators have the same diameter, then $g_1=g_2=g$. A typical value for $g_j$ is, for example, around 10/m.

Figure 3:
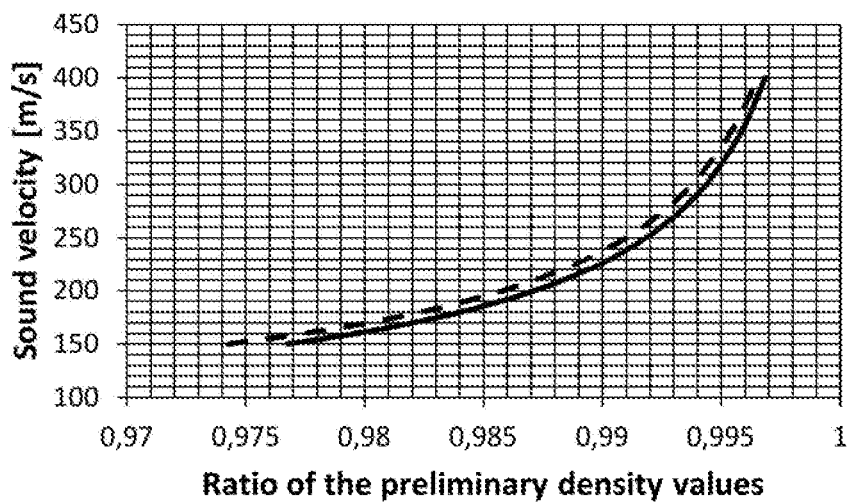
FIG. 3 shows a graph showing the relationship between the ratio of the density measured values and the velocity of sound.

FIG. 3 illustrates the velocity of sound as a function of the ratio V of the preliminary density values for two different value pairs of eigenfrequencies of the bending oscillation modes. In such case, the solid line is, for example, for $f_{1,1}$=250 Hz and $f_{1,2}$=350 Hz and the dashed line is for $f_{1,1}$=262.5 Hz and $f_{1,2}$=367.5 Hz. Assuming that for $f_{1,1}$=250 Hz and $f_{1,2}$=350 Hz, V=0.98 was ascertained, then that corresponds according to the solid line to a velocity of sound of, for instance, c=160 m/s. With that value thus found, then a correction term for a preliminary density value can be determined.

Using the ascertained velocity of sound, then in step 133 of the method in FIG. 2, a mode specific correction term $K_j$ calculated is as follows:

$$K_{1,1} := \left(1 + \frac{r}{\left(\frac{g \cdot c}{f_{1,1}}\right)^2 - 1}\right).$$

The preliminary density value $\rho_i$ is then calculated in step 140 of the method in FIG. 1 using the formula:

$$\rho_{corr} \cdot = \frac{\rho_{1,1}}{K_{1,1}}$$

The preliminary density value $\rho_{1,1}$ is thus divided by the correction term $K_{1,1}$ to obtain the corrected density value $\rho_{corr}$.

Figure 4:
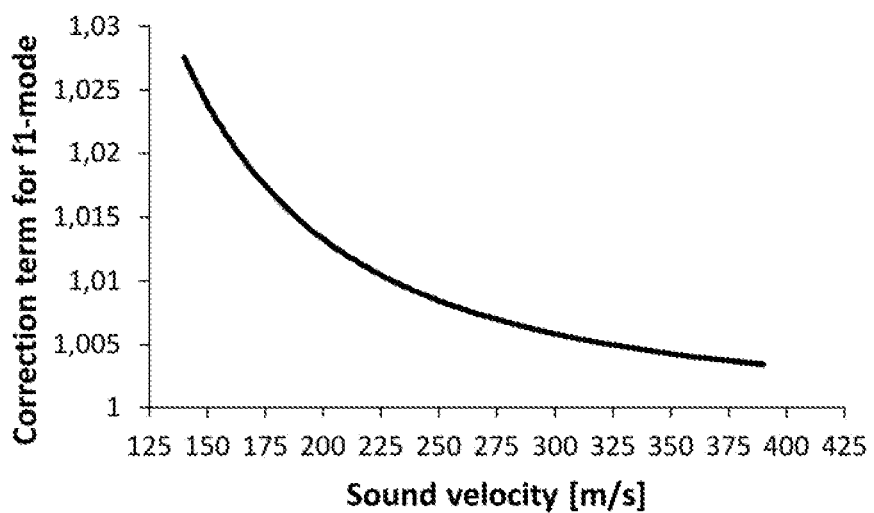
FIG. 4 shows a graph showing the relationship between a density correction value and the velocity of sound.

FIG. 4 illustrates the correction term $K_{i,j}$ ascertained in step 133 for the f1 mode in the case of an eigenfrequency of f1=250 Hz. According to the ascertained velocity of sound, c=160 m/s, in step 132, the preliminary density value based on the eigenfrequency of the f1-bending oscillation mode would be, for instance, 0.21% too large. The preliminary density value is thus divided by the correction term 1.021 to obtain the corrected density value.

Of course, also an $f_{1,j}$-mode and an $f_{3,j}$-mode of one or more oscillators can be taken into consideration, wherein the procedure for density compensation is exactly as described above based on the wanted modes of the two oscillators. To the extent that the eigenfrequency of an $f_{3,j}$ mode lies closer to the resonance frequency of a compressible medium, this procedure leads to a greater sensitivity and therewith to a more exact determining of the velocity of sound, or of the density correction factor for the preliminary density value based on a wanted mode eigenfrequency $f_{1,j}$.

Figure 5A:
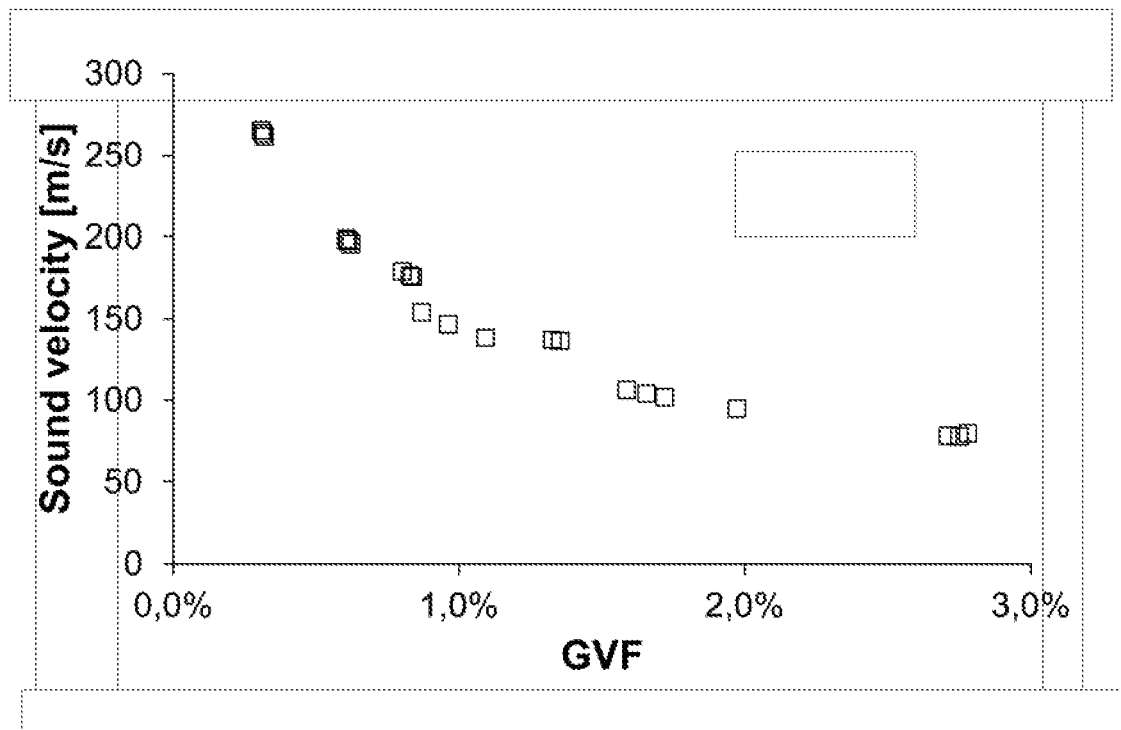
FIG. 5a shows a graph showing sound velocity values ascertained with the method of the invention.

Shown in FIG. 5a are the results of an experiment in which the dependence of the velocity of sound in salt water was ascertained as a function of the gas bubble fraction (GVF stands for Gas Void Fraction) based on a wanted mode and the f3 mode of the same tube pair. During the experiment, the eigenfrequency of the wanted mode decreased, in such case, with increasing gas load from about 177.3 Hz, for instance, to about 174.5 Hz, while the eigenfrequency of the f3 mode fell from about 1088.8 Hz to about 1015 Hz.

Figure 5B:
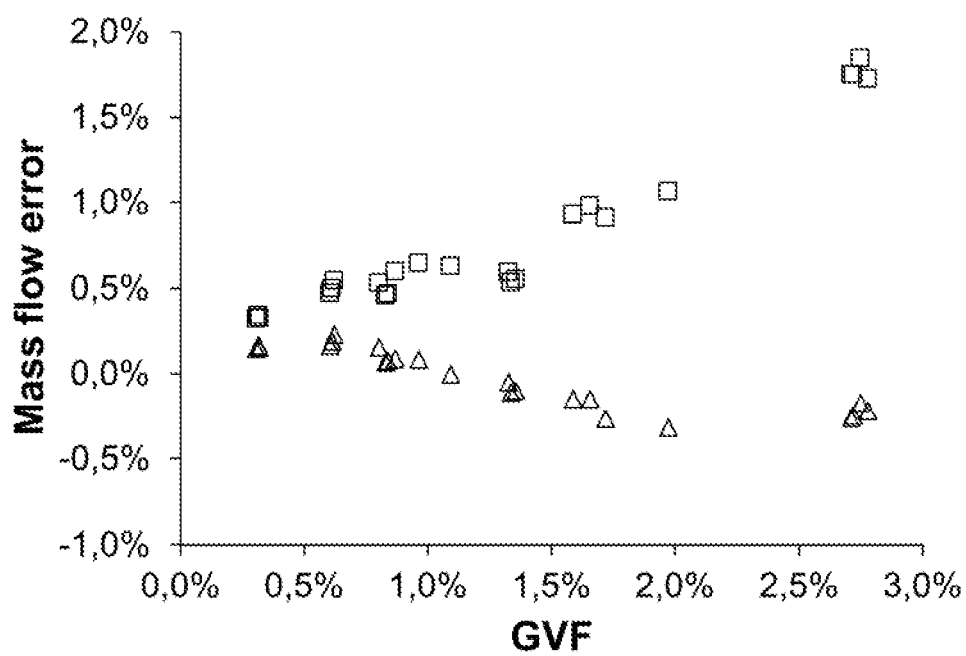
FIG. 5b shows a graph showing density values ascertained with the method of the invention.

FIG. 5b shows results for determining the mass flow according to the invention in one of the tube pairs by means of the method of the invention in the case of different values for the gas load, wherein the particular correction terms for correction of the preliminary mass flow values were ascertained based on the sound velocity values shown in FIG. 5a. The squares describe the error for the uncorrected values, while the triangles represent the error for corrected values of the invention.

The correction term for a preliminary mass flow measured value of a tube pair of the measuring transducer can be determined from the correction term for the preliminary density measured value ascertained based on the wanted mode by determining from the correction term $K_{1,j}$ for density, firstly, the density error $E_{\rho, i,j}$:

$$E_{\rho,1,j} := K_{1,j} - 1.$$

The mass flow error $E_{m,j}$ for correction of a preliminary mass flow value through the measuring tubes of an oscillator is especially twice $E_{\rho,1,j}$ of the preliminary density error $E_{\rho,1,j}$ of this oscillator for the preliminary density measured value based on the wanted mode, thus:

$$E_{m,j} := 2 \cdot E_{\rho,1,j}.$$

Equally, the mass flow error $E_m$ can be calculated as:

$$E_{m,j} := 2 \cdot \left(\frac{r}{\left(\frac{g \cdot c}{f_{1,j}}\right)^2 - 1}\right).$$

For a correction term $K_{m,j}$ for the mass flow through the measuring tubes of an oscillator, correspondingly:

$$K_{m,j} := 1 + E_{m,j},$$

wherein the corrected mass flow $\dot{m}_{corr,j}$ is ascertained as $$\dot{m}_{corr,j} \cdot = \frac{\dot{m}_{v,j}}{K_{m,j}},$$

and wherein $\dot{m}_v$ is a preliminary mass flow value through the measuring tubes of this oscillator, which results from the phase difference between the signals of two oscillation sensors arranged symmetrically on the measuring tube and a calibration factor.

As value for the corrected total mass flow through a measuring transducer with two oscillators composed, in each case, of a measuring tube pair, the sum of the corrected mass flow values of the two oscillators is formed:

$$\dot{m}_{corr,total} = \dot{m}_{corr,1} + \dot{m}_{corr,2}.$$

An example of an embodiment of a measuring transducer 200 of the invention will now be explained in greater detail based on FIGS. 6a to 6d. The measuring transducer 200 includes four curved measuring tubes 210a, 210b, 210c, 210d. The measuring tubes 210a, 210b, 210c, 210d extend between an inlet end collector 220 and an outlet end collector 220, and are connected with these securely, for example, by roll expansion, hard soldering or welding. Extending between the collectors 220 is a sturdy support tube 224, which is durably connected with both collectors, whereby the collectors 220 are rigidly coupled together. Support tube 224 includes, on its upper side, openings, through which the measuring tubes 210a, 210b, 210c, 210d extend from the collectors 220 out of the support tube 224 and then back in.

The collectors 220 have terminally, in each case, a flange 222, by means of which the measuring transducer 200 can be interposed in a pipeline. Through central openings 223 in the flanges 222, a medium flowing in the pipeline flows through the interposed measuring transducer 200, especially its measuring tubes 210a, 210b, 210c, 210d, in order that the mass flow of the medium can be measured using the measuring transducer 200.

A first measuring tube 210a and a second measuring tube 210b are connected inlet end and outlet end (in the following, on both ends), in each case, with two node plates 232a, 234a, wherein by the position of the two inner node plates 232a, thus by those, which on both ends are, in each case, farthest removed from the corresponding collector 220, a first oscillatory length of a first oscillator formed by the first measuring tube 210a, and the second measuring tube 210b is fixed. This first oscillatory length has large influence on a wanted mode and an f3 mode of the first oscillator, especially on its eigenfrequencies $f_{1,1}$ and $f_{3,1}$, with which the first oscillator can be excited.

A third measuring tube 210c and a fourth measuring tube 210d are connected at both ends, in each case, with two node plates 232c, 234c, wherein by the position of the two inner node plates 232c, thus by those, which on both ends are, in each case, farthest removed from the corresponding collector 220, a second oscillatory length of a second oscillator formed by the third measuring tube 210c and the fourth measuring tube 210d is fixed. This second oscillatory length has large influence on a wanted mode and an f3 mode of the second oscillator, especially on its eigenfrequencies $f_{1,2}$ and $f_{3,2}$, with which the second oscillator can be excited.

The outer node plates 234a, 234c, which, in each case, are arranged between the inner node plates 232a, 232c and the collectors 220, serve especially to define other oscillation nodes, in order, on the one hand, to reduce the mechanical maximum stresses on the oscillating measuring tubes, and, on the other hand, to minimize out-coupling of oscillatory energy into a pipeline, in which the measuring transducer is mounted, or in-coupling of disturbing oscillations from the pipeline.

The node plates 232a, 232c, 234a, 234c define oscillation nodes for the measuring tubes. Between the inner node plates 232a, 232c, the measuring tubes 210a, 210b can freely oscillate, so that the position of the inner node plates 232a, 232c essentially determine the oscillation characteristics of the oscillator formed by the measuring tubes 210a, 210b, especially eigenfrequencies of oscillation modes of the oscillator.

The free oscillatory length of the measuring tubes 210a, 210b of the first oscillator is significantly greater than free oscillatory length of the measuring tubes 210c, 210d of the second oscillator, wherein the measuring tubes 210a, 210b of the first oscillator are guided in a higher curve than the measuring tubes 210c, 210d of the second oscillator. This leads, for example, to the fact that in the case of the illustrated measuring transducer, which has measuring tubes with an outer diameter of 3 inch, thus about 76 mm, and a wall thickness of 3.6 mm, assuming filling of the measuring tubes with an incompressible medium with a density of water, the first oscillator has a wanted mode with an eigenfrequency of, for instance, 210 Hz, while the eigenfrequency of the wanted mode of the second oscillator is, for instance, 160 Hz. The corresponding eigenfrequencies of the $f_3$ modes are, in each case, for instance, a factor of 6 greater.

Figure 7:
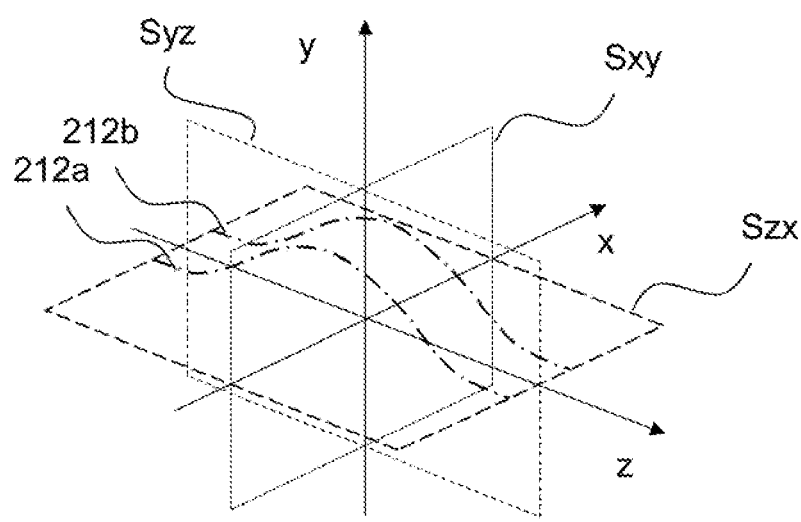
FIG. 7 shows a coordinate system for description of some properties of the CMD of the invention.

Before the operation of the measuring transducer 200 of the invention is explained further, its symmetry characteristics will be presented using FIG. 7. Shown in FIG. 7 are measuring tube central axes 212a, 212b of the first measuring tube 210a and the second measuring tube 210b, respectively, which form the first oscillator. The measuring tube central axes 212a, 212b extend symmetrically to a first mirror plane Syz, the measuring transducer longitudinal plane, which extends between the measuring tubes. The measuring tube central axes extend further symmetrically to a second mirror plane Sxy, the measuring transducer transverse plane, which extends perpendicularly to the measuring transducer longitudinal plane.

The measuring tube axes 212a, 212b of the first oscillator extend preferably in planes, which extend in parallel with the first measuring transducer longitudinal plane.

Regarding a third plane Szx, which extends perpendicularly to the first mirror plane and the second mirror plane, and in which the measuring tube axes 212a, 212b extend into the collectors, no symmetry of the measuring tubes is present.

The above explanations hold correspondingly for the measuring tube axes of the third and fourth measuring tubes 210c, 210d of the second oscillator.

Preferably, the axes of the first measuring tube 210a and the third measuring tube 210c extend in a first plane as well as the measuring tube axes of the second and fourth measuring tubes 210b, 210d in a second plane, each of which extends in parallel with the first mirror plane Syz.

The line of intersection between the first mirror plane Syz and the third plane Szx defines a Z axis of a coordinate system of the measuring transducer. The line of intersection between the second mirror plane Sxy and the third plane Szx defines an X axis of the coordinate system, and the line of intersection between the first mirror plane Syz and the second mirror plane Sxy defines the Y axis of the coordinate system. With the coordinates defined in such a way, we return to FIGS. 6a to 6d.

For exciting bending oscillations of the measuring tubes in the X direction, a first exciter mechanism 240a is provided—centrally in the measuring transducer with reference to the longitudinal direction, or the Z axis—between the first measuring tube 210a and the second measuring tube 210b of the first oscillator, and a second exciter mechanism 240c is provided—also centrally in the measuring transducer with reference to the longitudinal direction, or the Z axis—between the third measuring tube 210c and the fourth measuring tube 210d of the second oscillator, for example, in each case, an inductive exciter mechanism, which includes, for example, a coil on one measuring tube and a plunging armature on the oppositely lying measuring tube. For registering the oscillations of the measuring tube pairs, the oscillators are provided in the longitudinal direction symmetrically to the exciter mechanisms 240a, 240c, in each case, with a first sensor arrangement 242a-1, 242c-1 and a second sensor arrangement 242a-2, 242c-2, each of which is embodied as an inductive arrangement with a coil on one tube and a plunging armature on the other tube. Details of such sensor arrangements are known to those skilled in the art and need not be explained here in further detail. For purposes of perspicuity, the positions of the exciter mechanisms and the sensor arrangements were indicated with reference characters only in FIG. 6b.

The oscillators are each excited with at least one of their current eigenfrequencies of the wanted mode (f1 mode) and/or of the f3 mode, wherein, for this, either the exciter mechanisms can, in each case, be driven by an independent driver circuit with the signal of a particular eigenfrequency, or wherein the exciter mechanisms can be connected in series and supplied with a superimposed signal of the eigenfrequencies of both oscillators. Due to the high quality of the oscillators, each oscillator is excited to oscillate practically with only its eigenfrequency.

Figure 6A:
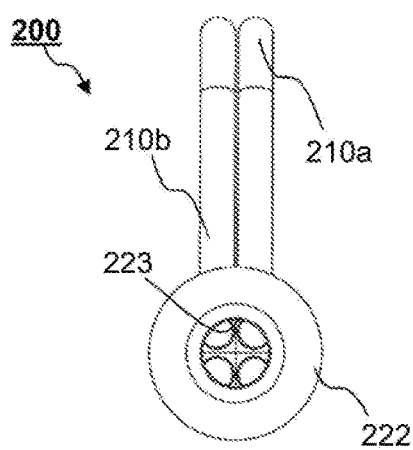
FIG. 6a shows a schematic front view of a first example of an embodiment of a CMD of the invention.
Figure 6B:
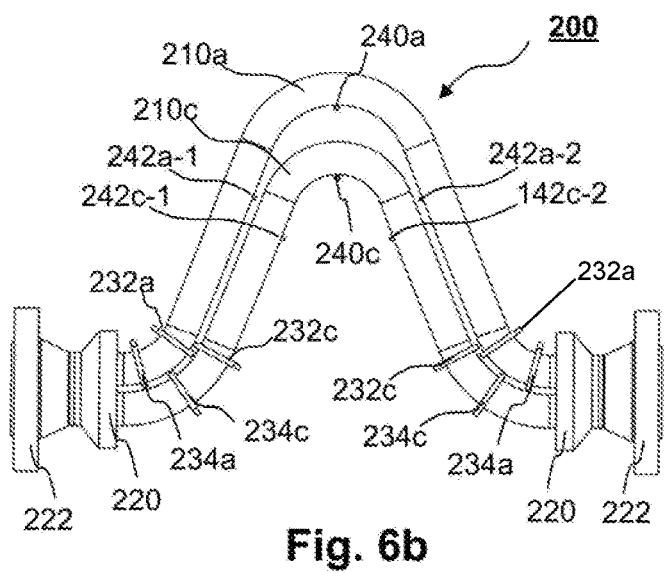
FIG. 6b shows a schematic, side view of the first example of an embodiment of a CMD of the invention without support tube.
Figure 6C:
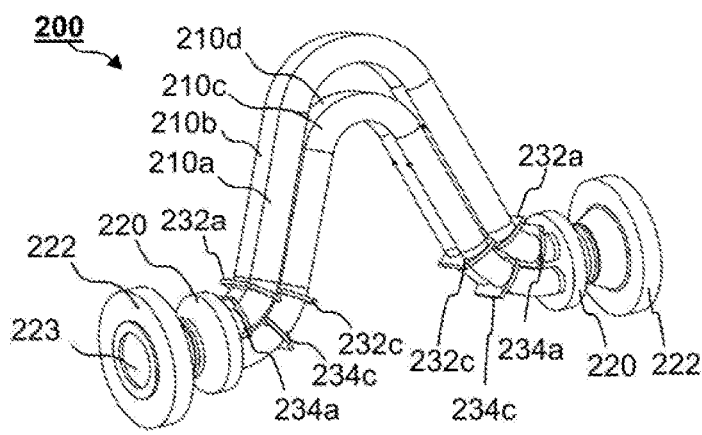
FIG. 6c shows a perspective view of the first example of an embodiment of a CMD of the invention without support tube.
Figure 6D:
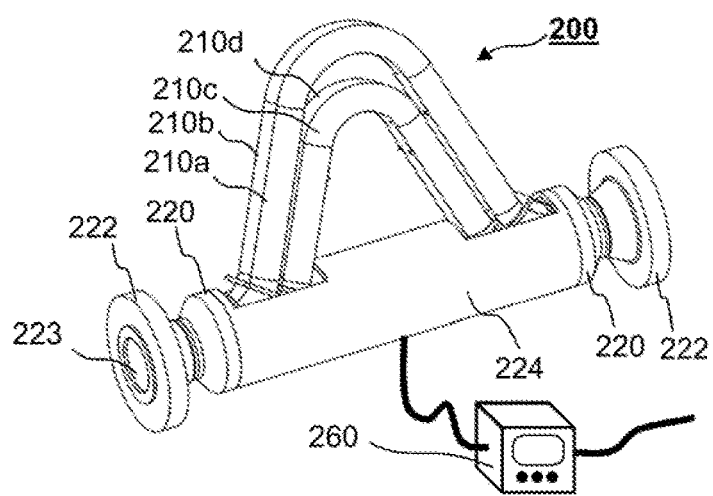
FIG. 6d shows a perspective view of the first example of an embodiment of a CMD of the invention with mounted support tube.

The measuring transducer further includes, as shown schematically in FIG. 6d, an electronics unit 260, which contains an operating and evaluation circuit, which includes the driver circuits for exciting the measuring tube oscillations as well as signal processing circuits for processing the sensor signals. Furthermore, the operating and evaluating circuit includes at least one microprocessor for control of the measuring transducer and for performing the method of the invention. The electronics unit 260 is connectable via lines to a superordinated unit, for example, a control system, from which it is supplied power, and to which it outputs measurement data. The electronics unit can be arranged separated from or mounted on the support tube or in a housing (not shown) around the measuring tube curves.

The invention claimed is:

1. A method for determining a physical parameter of a compressible medium using a measuring transducer of vibration-type, the method comprising:

providing a measuring transducer of vibration-type having at least two oscillators, each oscillator including a pair of measuring tubes, wherein the pairs of measuring tubes are arranged for parallel flow, and wherein the at least two oscillators have mutually independent oscillator oscillations with mutually differing eigenfrequencies for corresponding oscillation modes;

determining the values of the eigenfrequencies of at least two different oscillator oscillations;

determining at least two preliminary density measured values based on the values of the eigenfrequencies; and determining a correction term for one of the preliminary density measured values, and/or for a preliminary measured value of flow, based on the preliminary density measured values and the values of the eigenfrequencies.

2. The method of claim 1, wherein the correction term for a preliminary density measured value of an oscillator depends on the value of the eigenfrequency of the oscillator and on either a quotient between the velocity of sound in the medium, which contains microbubbles therein, or a resonance frequency of oscillations of the microbubble-containing medium relative to a measuring tube of the oscillator.

3. The method of claim 1, wherein the eigenfrequencies of a same bending oscillation mode of the at least two oscillators are ascertained and used for determining the correction term.

4. The method of claim 1, wherein the eigenfrequency of a wanted mode and the eigenfrequency of an f3 mode are ascertained and used for determining the correction term.

5. The method of claim 4, wherein the lowest available eigenfrequency of the wanted mode is used for determining the correction term.

6. The method of claim 4, wherein the highest available eigenfrequency of the f3 mode is used for determining the correction term.

7. The method of claim 1, wherein the correction term for the preliminary density measured value based on the eigenfrequency of a selected oscillation mode has the form:

$$K_{i,j} := \left(1 + \frac{r}{\left(\frac{g \cdot c}{f_{i,j}}\right)^2 - b}\right),$$

wherein:

$$\rho_{corr} := \frac{\rho_{i,j}}{K_{i,j}},$$

wherein index i refers to the selected mode, and index j refers to a selected oscillator of the at least two oscillators, and wherein $K_{i,j}$ is the correction term, $\rho_{i,j}$ is the preliminary density measured value, r and g are media independent constants, c is the velocity of sound in the medium, $f_{i,j}$ is the eigenfrequency of the selected mode, $\rho_{corr}$ is the corrected density, and b is a scaling constant, wherein a ratio r/b<1 and/or b=1.

8. The method of claim 7, wherein the ratio r/b<0.9 and/or b=1.

9. The method of claim 7, wherein a density error of a preliminary density value based on the eigenfrequency of the selected mode is:

$$E_{\rho i,j} := K_{i,j} - 1,$$

wherein $E_{\rho i,j}$ is the density error, and wherein a mass flow error of a preliminary mass flow value through the measuring tube pair of the selected oscillator with the index j is ascertained proportionally to the density error of the first preliminary density value based on the eigenfrequency of the selected oscillator in the f1 mode, thus:

$$E_{m,j} := k \cdot E_{\rho 1,j},$$

wherein $E_{m,j}$ is the mass flow error $E_{m,j}$, the proportionality factor k is not less than 1.5 and not more than 3.

10. The method of claim 9, wherein the proportionality factor k in not less than 1.8 and not more than 2.25.

11. The method of claim 9, wherein the proportionality factor k is 2.

12. The method as claimed in claim 9, wherein a correction term for the mass flow value is ascertained as:

$$K_{m,j} := 1 + E_{m,j},$$

wherein $K_m$ is the correction term for the mass flow value, and a corrected mass flow through the measuring tube pair of the oscillator with the index j is ascertained as:

$$\dot{m}_{corr,j} \cdot = \frac{\dot{m}_{v,j}}{K_{m,j}},$$

wherein $\dot{m}_{corr,j}$ is the corrected mass flow, and $\dot{m}_{v,j}$ is the preliminary mass flow value through the measuring tube pair of the oscillator with the index j, and wherein a total corrected mass flow through the measuring transducer is ascertained by summing the contributions of the at least two oscillators, thus:

$$\dot{m}_{corr,total} = \dot{m}_{corr,1} + \dot{m}_{corr,2},$$

wherein $\dot{m}_{corr,total}$ is the total corrected mass flow.

13. A measuring transducer of vibration-type for determining a physical parameter of a compressible medium, comprising:

first, second, third and fourth measuring tubes, each having an inlet end and an outlet end, wherein all inlet ends and all outlet ends of the measuring tubes are combined with respective collectors at each end for parallel flow;

a first actuator arrangement and a second actuator arrangement;

a first sensor arrangement and a second sensor arrangement, each configured to register oscillations and generate signals based thereon; and an operating and processing circuit configured to drive the first and second actuator arrangements and to register the signals of the first and second sensor arrangements, wherein the first measuring tube and the second measuring tube are connected at or near their inlet ends with a first rigid node plate and at or near their outlet ends with a second rigid node plate, the first and second node plates arranged spaced from each respective collector at its respective end to form a first oscillator, wherein the first actuator arrangement is adapted to excite a wanted mode between the two measuring tubes of the first oscillator, wherein the third measuring tube and the fourth measuring tube are connected at or near their inlet ends with a third rigid node plate and at or near their outlet ends with a fourth rigid node plate, the third and fourth node plates arranged spaced from each respective collector at its respective end to form a second oscillator, wherein the second actuator arrangement is adapted to excite a wanted mode between the two measuring tubes of the second oscillator, wherein the first oscillator and the second oscillator each have at least one wanted mode with first and second wanted mode eigenfrequencies, respectively, wherein the magnitude of the difference between the wanted mode eigenfrequencies of the two oscillators is at least 0.1 times the lesser of the first and second wanted mode eigenfrequencies, wherein the first sensor arrangement is adapted to register oscillations of the first oscillator, and the second sensor arrangement is adapted to register oscillations of the second oscillator, wherein the operating circuit and evaluating circuit is configured to drive the first and second actuator arrangements such that bending oscillation modes of the first and second oscillators are excited at at least the eigenfrequencies of the wanted modes independently of one another, and wherein the operating and evaluating circuit is further configured to:

determining the values of the eigenfrequencies of at least two different oscillator oscillations;

determining at least two preliminary density measured values based on the values of the eigenfrequencies; and determining a correction term for one of the preliminary density measured values, and/or for a preliminary measured value of flow, based on the preliminary density measured values and the values of the eigenfrequencies.

14. The measuring transducer of claim 13, wherein the magnitude of the difference between the wanted mode eigenfrequencies of the two oscillators is at least 0.4 times the lesser of the two wanted mode eigenfrequencies.

15. The measuring transducer of claim 13, wherein the first and second measuring tubes of the first oscillator extend symmetrically relative to a first mirror plane, which extends between the measuring tubes of the first oscillator, and wherein the third and fourth measuring tubes of the second oscillator extend symmetrically relative to the first mirror plane, which further extends between the measuring tubes of the second oscillator.

16. The measuring transducer of claim 15, wherein the first and second measuring tubes of the first oscillator extend symmetrically relative to a second mirror plane, which extends perpendicularly to the first mirror plane and intersects the measuring tubes of the first oscillator, wherein the third and fourth measuring tubes of the second oscillator extend symmetrically relative to the second mirror plane and are intersected by the second mirror plane, and wherein the measuring tubes oscillate in the wanted mode perpendicularly to the first mirror plane and symmetrically to the second mirror plane.

17. The measuring transducer of claim 13, wherein the operating and evaluating circuit is further configured to drive the first and second actuator arrangements such that the wanted modes of the first and second oscillators are excited simultaneously.

18. The measuring transducer of claim 16, wherein the measuring tubes of at least one oscillator are excited in a second oscillatory mode symmetric to the second mirror plane and having a higher eigenfrequency than the wanted mode of the at least one oscillator.

19. The measuring transducer of claim 18, wherein the operating and evaluating circuit is further configured to drive the first and second actuator arrangements such that at least one f3 mode is excited simultaneously with the wanted mode of the at least one oscillator or with the wanted modes of both oscillators.

* * * * *